(12) United States Patent
Pipkin

(10) Patent No.: US 7,073,449 B2
(45) Date of Patent: Jul. 11, 2006

(54) SEAT SUPPORTED READING TRAY

(76) Inventor: Marc Calvin Pipkin, 219 Smithfield Ave., Summerville, SC (US) 29485

( * ) Notice: Subject to any disclaimer, the term of this patent is extended or adjusted under 35 U.S.C. 154(b) by 202 days.

(21) Appl. No.: 10/778,447

(22) Filed: Feb. 13, 2004

(65) Prior Publication Data

US 2005/0178297 A1 Aug. 18, 2005

(51) Int. Cl.
*A47B 85/00* (2006.01)
(52) U.S. Cl. .............................. 108/44; 108/25; 108/9
(58) Field of Classification Search ................. 108/25, 108/6, 42, 43, 44, 49, 9, 7, 10; 312/231, 312/233; 297/188.04, 188.05, 173; 248/442.2, 248/447, 453, 454, 460
See application file for complete search history.

(56) References Cited

U.S. PATENT DOCUMENTS

| | | | |
|---|---|---|---|
| 354,870 A | 12/1886 | Munger | |
| 1,303,280 A * | 5/1919 | Fliedner | 108/3 |
| 1,765,514 A * | 6/1930 | Wetmore | 108/10 |
| 1,851,906 A * | 3/1932 | Henderson | 312/196 |
| 2,013,542 A * | 9/1935 | Nordmark | 108/3 |
| 2,346,919 A * | 4/1944 | Hillenbrand | 108/8 |
| 2,583,097 A * | 1/1952 | Heimann | 248/456 |
| 2,843,226 A * | 7/1958 | Nordmark | 188/67 |
| 2,848,290 A * | 8/1958 | Doty | 108/3 |
| 2,906,575 A * | 9/1959 | Schlackman et al. | 108/9 |
| 3,336,076 A | 8/1967 | Malitte | |
| 3,475,052 A * | 10/1969 | Kaposi | 297/153 |
| 3,632,161 A | 1/1972 | Arfaras et al. | |
| 3,698,328 A | 10/1972 | Weir | |
| 3,773,381 A | 11/1973 | Brennan | |
| 3,795,422 A | 3/1974 | Robinson et al. | |
| 4,108,083 A * | 8/1978 | Espinosa | 108/6 |
| 4,116,413 A * | 9/1978 | Andersen | 248/451 |
| 4,140,296 A | 2/1979 | Guzman Guillen | |
| 4,281,874 A | 8/1981 | Iwans et al. | |
| D272,402 S | 1/1984 | Marrujo | |
| 4,472,843 A * | 9/1984 | Chermak | 4/559 |
| 4,592,285 A * | 6/1986 | Egli | 108/9 |
| 4,765,583 A * | 8/1988 | Tenner | 248/444 |
| 4,978,096 A * | 12/1990 | Struckmann | 248/451 |
| 5,112,021 A | 5/1992 | Greene | |
| 5,377,946 A * | 1/1995 | Pannu | 248/456 |
| 5,443,018 A | 8/1995 | Cromwell | |
| 6,003,446 A * | 12/1999 | Leibowitz | 108/43 |
| 6,085,666 A | 7/2000 | Anderson et al. | |
| 6,199,816 B1 | 3/2001 | Case | |

(Continued)

OTHER PUBLICATIONS

B/E Aerospace, B/E Premium Industrial Design Studio, www.bepremiumseating.com, not dated.

*Primary Examiner*—Janet M. Wilkens
(74) *Attorney, Agent, or Firm*—Harleston Law Firm, LLC; Kathleen M. Harleston

(57) ABSTRACT

A reading tray for mounting on an aircraft seat includes: (a) a substantially planar top side and bottom side; the top side being substantially parallel to the opposite, bottom side; (b) a space in the center of the top side extending partially through the tray; (c) a support panel that is removably insertable in the space; and (d) an arm support assembly connected to the support panel for supporting the support panel in an open, inclined position, or in an alternate, closed position wherein the support panel fits closely within the space with an upper face of the support panel flush with the top side of the tray.

19 Claims, 7 Drawing Sheets

U.S. PATENT DOCUMENTS

| | | |
|---|---|---|
| 6,446,929 B1 | 9/2002 | Scott et al. |
| 6,478,256 B1 | 11/2002 | Williamson |
| 6,550,861 B1 | 4/2003 | Williamson |
| D487,856 S | 3/2004 | Kalinowski et al. |
| D496,197 S | 9/2004 | Wenzler |
| 6,792,875 B1 | 9/2004 | Williamson et al. |

* cited by examiner

SEAT SUPPORTED READING TRAY

BACKGROUND OF THE INVENTION

1. Technical Field

The present invention relates to a tray for movable attachment to a seat on an aircraft or the like, and more particularly to a seat supported reading or meal tray that includes a collapsible support panel for supporting a book, magazine, or another type of reading material at an incline for hands-free convenience.

2. Background Information

Passenger air lines usually have a seat back tray available for each passenger. The tray is typically attached to the back of the seat immediately in front of the user. The tray pivots on the seat back, so that it may be stored against the seat back or folded down for use by the passenger. Most airline passengers use the tray to hold dishes of food and cups or cans of beverages during snack or meal time. Some passengers also use the tray as a desk, for example, for supporting a laptop computer, hand-held personal digital assistant, or notepad.

On long flights, passengers must watch television or in-flight movies, eat, write, type, or otherwise work for a prolonged period of time, since for safety reasons airlines discourage passengers from leaving their seats except to use the facilities. With regard to reading, holding a book, magazine, or other type of reading material for hours can be tiresome. Thus, there is a need for a versatile tray on which a passenger can set cups or dishes, or alternatively prop up his or her reading material. The present invention is a versatile tray for attachment to a seat of an aircraft or the like, which includes a collapsible support panel for supporting reading material.

BRIEF SUMMARY OF THE INVENTION

The present invention is a tray for movable attachment to the back of a seat on an aircraft or the like, which incorporates a collapsible support panel. The tray is preferably generally rectangular in shape, with a central space housing a movable support panel. An arm support assembly includes pivotable left and right arms movably connected to a first wall and an opposite, third wall, respectively, bordering the space, and a support rod. The arms are connected to the opposite ends of a support panel rod, which extends through the support panel. The first wall houses a recessed left track and the third wall houses a matching recessed right track. By means of support panel pins extending from a lower end of the support panel, which slide within the tracks, as well as the pivotable arm support assembly, the support panel reversibly rises from a closed, horizontal position within the space to an open, inclined position for supporting reading material, such as a book or magazine. A movable support lever, which is automatically engaged by movement of the support panel, further secures reading material in place on the support panel. An optional page holder on the support panel helps hold the pages of the reading material open.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
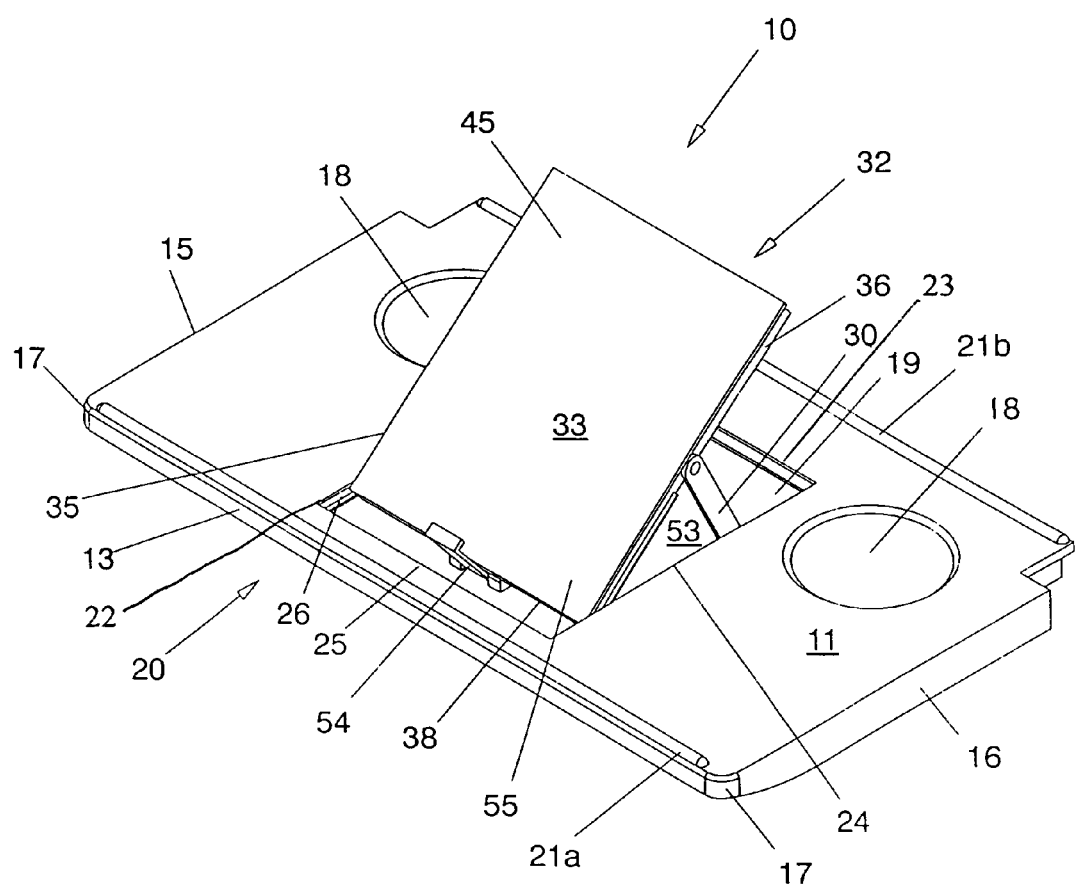
FIG. 1 shows a perspective view of a seat supported reading tray according to the present invention, shown in an open, reading position.

In the following description, like reference characters designate like or corresponding parts throughout the several views. Also, in the following description, it is to be understood that such terms as "front," "rear," "within," and the like are words of convenience and are not to be construed as limiting terms. Referring in more detail to the drawings, the invention will now be described.

Referring to FIG. 1, the present invention is a seat supported reading tray, generally referred to herein by reference number 10, for supporting reading material, such as a book, magazine, cross-word puzzle, booklet, or pamphlet, on a support panel 32 of the tray 10 in a generally upright position. A passenger seated in front of the tray 10 may comfortably read without encumbering his or her hands and arms with the reading material. The tray 10, which is preferably supported on the back of the seat immediately in front of the user, can alternatively be used with the support panel in a closed position for supporting dishes and/or cups during snack or meal time.

The seat supported reading tray 10 is generally rectangular in shape, and has a substantially planar top side 11, bottom side 12, front side 13, rear side 14, left side 15, and right side 16. The top side 11 is substantially parallel to the bottom side 12. The substantially planar top side 11 and bottom side 12 are oriented substantially perpendicularly to the substantially planar front side 13, rear side 14, left side 15, and right side 16. The front side 13 is opposite to the rear side 14, and the left side 15 is opposite to the right side 16. Preferably, the two tray corners 17 between the front side 13 and the left or right side 15, 16 are rounded or beveled to minimize the likelihood of injury to a passenger or flight attendant reaching over the tray 10.

The tray of the present invention can be attached to a conventional hinge mechanism so that it swings out of a side arm rest compartment next to the user's seat where there are partitions rather than airline seats directly in front of the first seats. This accommodates passengers seated in the first seats at the front of the various sections of the aircraft. In this case, the support panel 32 works the same as is described herein.

Although it is primarily intended for use in the coach section of an aircraft, such as an airline jet, the tray of the present invention can be adapted for use on a train, car, or other vehicle, or for a chair or day bed of a hospital patient or wheelchair occupant, for example. The open support panel 32 can also be used to support other types of material, such as a game, hand-held electronic game device, or vanity mirror in addition to reading materials.

The seat supported reading tray 10 is mounted on the back of a front seat (not shown) immediately in front of the user using a conventional attachment mechanism. The tray 10 is preferably mounted on two tray arms attached to the seat back, so that the tray may pivot from a closed, generally vertical position, in which the top side 11 of the reading tray 10 rests up against the back of the front seat, to an open, down tray position, in which the tray 10 lies in a generally horizontal plane in front of the user's seat. In this open, down tray position, the tray 10 may be constructed so that it slides away from and towards the back of the front seat within the horizontal plane. These features allow the passenger sitting in the seat served by the tray 10 to use the tray when appropriate, stow the tray 10 during take-off and landing of the aircraft or other times when the tray 10 is not needed, and adjust the distance between himself or herself and the tray 10 by pushing it away towards the front seat or pulling it closer towards himself or herself.

Continuing with FIG. 1, the top side 11 of the tray 10 further comprises a front ridge 21a adjacent to the front side 13 and a rear ridge 21b adjacent to the rear side 14 of the tray to prevent items from sliding off the tray 10 when the tray is open and the aircraft is in motion. For example, the ridges 21a, b may prevent pencils and pens from falling off of the reading tray 10 when the aircraft experiences turbulence. The top side 11 of the reading tray 10 also comprises at least one drink holder depression 18. The drink holder 18 is a generally circular impression in the top side 11 of the tray, which accommodates the base of a standard cup used in airline food service and helps prevent the cup from sliding around on the tray 10 while the aircraft is in the air. Drink holder depressions 18 are preferably located in rear corners of the top side 11, so that the aircraft passenger has a large, uninterrupted, flat workspace. Of course, work materials can also be placed over the top of the drink holder depression 18 when it is not in use.

A generally rectangular-shaped space 19 formed by five substantially planar walls, which is preferably at the center of the tray 10, houses a reading assembly 20. The five walls bordering the rectangular-shaped space 19 are a first wall 22, second wall 23, third wall 24, fourth wall 25, and fifth wall 53. The first wall 22, second wall 23, third wall 24, and fourth wall 25 are substantially perpendicularly oriented to the fifth wall 53, which is at the bottom. The fifth wall 53 is substantially perpendicular to the top side 11 of the tray 10. The first wall 22 is opposite to the third wall 24, and the second wall 23 is opposite to the fourth wall 25. The reading assembly 20 comprises the support panel 32, and an arm support assembly 29, a track mechanism 40, and a support lever mechanism 52 for supporting the support panel 32.

Figure 2:
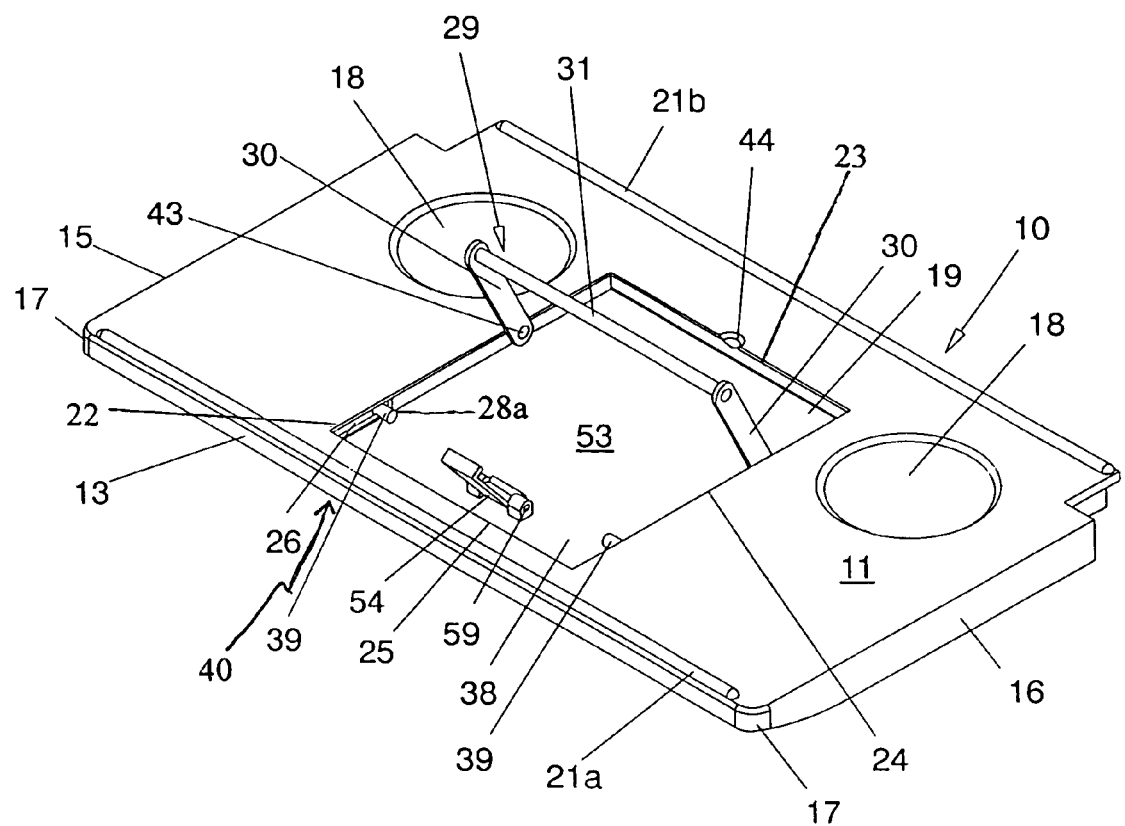
FIG. 2 is a perspective view of a tray according to FIG. 1, shown without a support panel for purposes of illustration.

Referring to FIG. 2, which is shown without a support panel 32 for purposes of illustration, the track mechanism 40 of the reading assembly 20 comprises two mirror image, recessed tracks in which the lower end 55 of the support panel 32 travels. A left track 26 is housed within the first wall 22 and a right track 27 is housed within the third wall 24 of the tray. The recessed tracks 26, 27 begin at the ends of the first wall 22 and third wall 24 nearest the front side 13 of the tray 10 and extend a few inches up along the first and third walls. The recessed tracks 26, 27 are generally rectangular in shape. The left track 26 ends in a first detent 28a and the right track 27 ends in a second detent 28b. Preferably, the track detents 28a, 28b are mirror image and substantially semi-circular in shape.

The reading assembly 20 further comprises the arm support assembly 29, which includes two straight, matching arms 30, as seen in FIG. 2. A left one of the arms 30 is pivotally attached at one end to the first wall 22 at approximately the mid-point of the first wall 22 behind the left track 26, and a right one of the arms 30 is likewise pivotally attached at one end to the third wall 24 at approximately the mid-point of the third wall 24 behind the right track 27. Opposite ends of a support panel rod 31, which is preferably cylindrical in shape, are pressed into a hole in the upper end of each arm 30. The support panel rod 31 movably extends through a transverse rod hole 41 in the support panel 32 (see FIG. 3), with one arm 30 on each side of the support panel 32 (see FIG. 1). The support panel rod 31 permits the support panel 32 to move back and forth like a teeter-totter about the support panel rod 31.

In use, the support panel 32 provides a surface for maintaining in an inclined position any type of reading material, such as a book, booklet, crossword puzzle, magazine, pamphlet, etc. The support panel 32 is preferably generally rectangular in shape and has a substantially planar support panel upper face 33, support panel lower face 34, support panel left side 35, support panel right side 36, support panel top side 37, and support panel bottom side 38 (see FIGS. 1 and 3). The support panel upper face 33 and the support panel lower face 34 are oriented substantially perpendicularly to the support panel left side 35, support panel right side 36, support panel top side 37, and support panel bottom side 38. The support panel top side 37 is opposite to the support panel bottom side 38, and the support panel left side 35 is opposite to the support panel right side 36.

Figure 3:
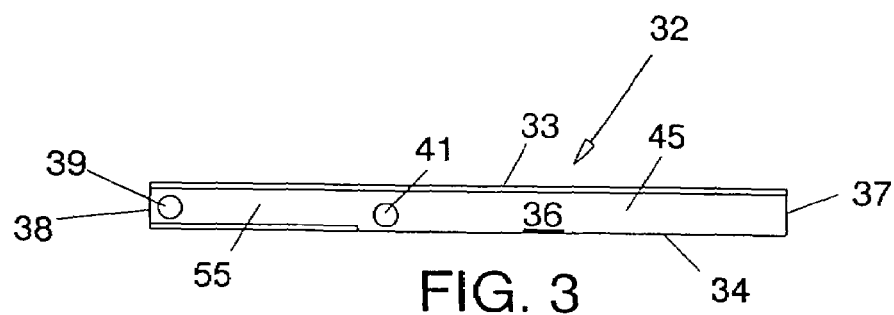
FIG. 3 is a side elevational view of a support panel according to the present invention.

The track mechanism 40 further includes two matching support panel pins 39, which project from opposite sides of the support panel 32. As shown in FIGS. 2 and 3, a first one of the support panel pins 39 protrudes from the support panel left side 35 at a lower end 55 of the support panel 32, and a second, matching one of the support panel pins 39 protrudes from the support panel right side 36 at a corresponding location in the lower end 55 of the support panel 32. The support panel pins 39 are preferably short and generally cylindrical in shape.

Figure 4:
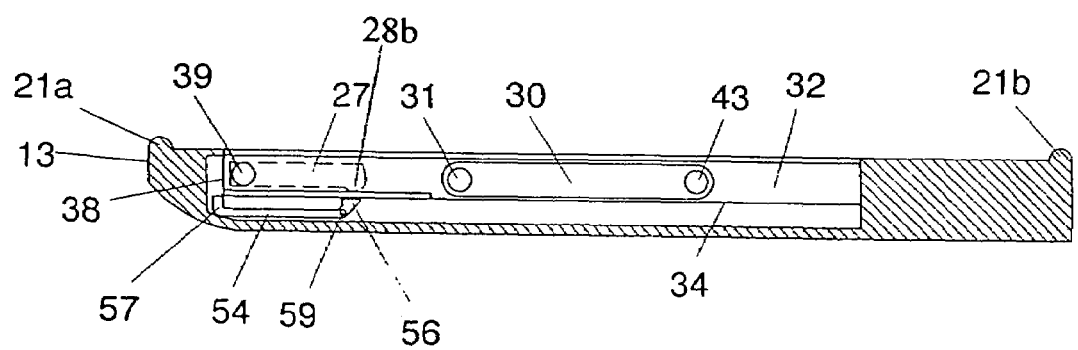
FIG. 4 is a cutaway side elevational view of a tray according to the present invention, shown in a closed, eating position.

As shown in FIG. 2, the arm support assembly 29 preferably includes two pivot pins 43 connecting the lower ends of the arms 30 to the first and third walls 22, 24, respectively. The support panel rod 31 permits back and forth movement of the support panel 32. The lower set of pivot points permit the arms 30 to pivot back and forth, which allows the arm support assembly to swing up and down. Together, they allow the support panel 32 to assume a horizontal position in which the support panel 32 lies within the space 19 with the support panel upper face 33 flush with the top side 11 of the tray 10, as shown in FIG. 4.

Figure 6:
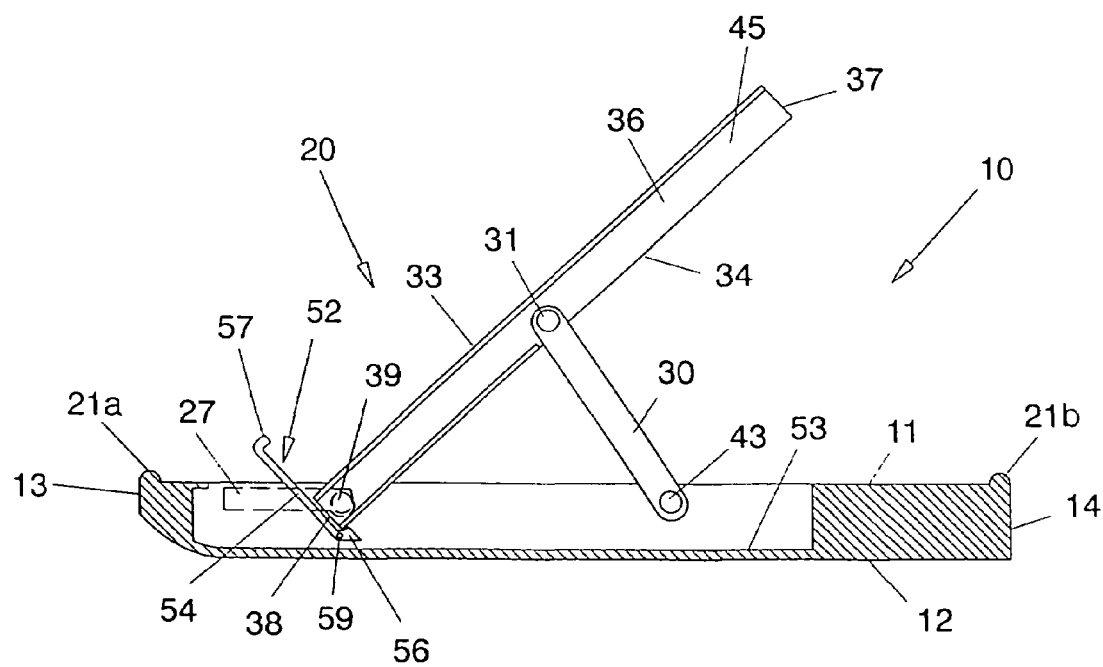
FIG. 6 is a cutaway side elevational view of a tray according to FIG. 4, shown in an open, reading position.

The support panel rod 31, pivotable arms 30, and support lever mechanism 52 also allow the inclined position, in which the support panel 32 is angled upward as illustrated in FIG. 6. In the inclined position, the preferred angle between the support panel lower face 34 and the top side 11 of the tray 10 is between about 40 and about 45 degrees. A book or magazine that is supported at such an angle is easier for a seated user to read than a book or magazine that is flat on a tray in front of him or her. The inclined support panel mimics the natural angle at which a seated reader holds a book.

The tray herein is preferably not a folding tray, and does not have hinged fold-out sections.

Figure 5:
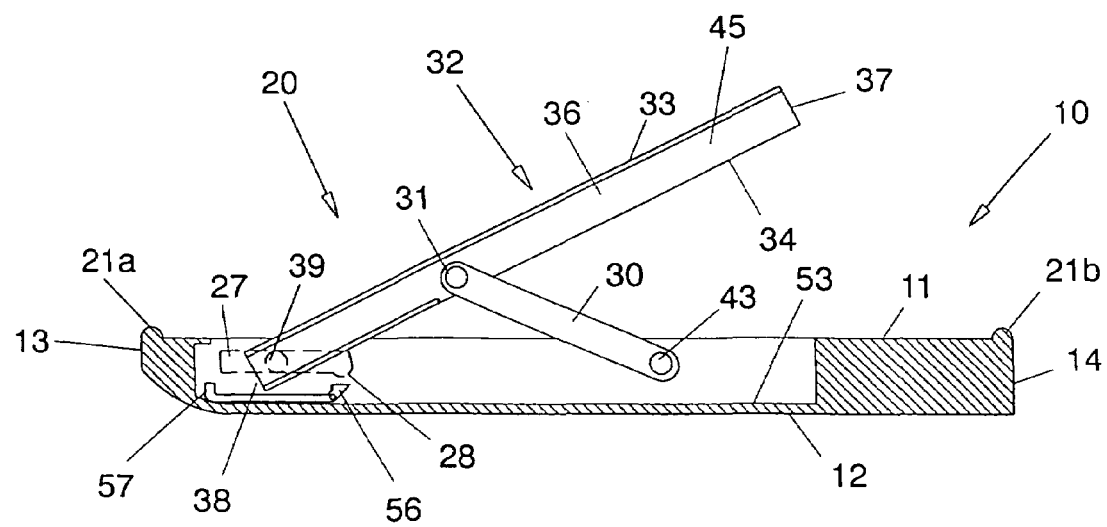
FIG. 5 is a cutaway side elevational view of a tray according to FIG. 4, shown in a partially open position.

To change the support panel 32 from the horizontal position to the raised, inclined position, a user inserts his or her index finger into a finger well 44, which is an indentation in the top side 11 of the tray 10 adjacent to an upper end 45 of the support panel 32, and grasps the support panel top side 37. The user then begins to lift the upper end 45 of the support panel 32 so that the support panel 32 angles away from the tray 10 as shown in FIG. 5. As the user lifts the support panel 32, the support panel pins 39 slide within the short tracks 26, 27 toward the track detents 28a, 28b. As the user continues to lift the upper end 45 of the support panel 32, the support panel pins 39 slide within the tracks 26, 27 until the pins 39 enter the track detents 28a, 28b. The positioning of the support panel pins in the track detents locks the support panel 32 in the inclined position.

The support lever mechanism 52 comprises a support lever 54, which is preferably hingedly affixed at the bottom of the space, which is the horizontal fifth wall 53, approximately midway between tracks 26, 27. In the preferred embodiment shown in FIGS. 2 and 4, the support lever 54 has two opposite upturned ends 56, 57. The support lever 54 pivots around a support lever pin 59, which extends through the support lever at the first, upturned end 56. Each end of the support lever pin 59 extends into a support lever boss 50 protruding from the fifth wall 53. The support lever pin 59 rotates in each boss 50, so the opposite, second, upturned end 57 of the support lever can be moved up and down.

The support lever 54 comes into view when the support panel 32 is moved to the open, inclined position. The support lever 54 is automatically engaged by movement of the support panel 32. When the support panel 32 is in the horizontal position as shown in FIG. 4, the support lever 54 is parallel and adjacent to the fifth wall 53 immediately below the lower end 55 of the support panel 32, so it is hidden from view by the closed support panel. When the support panel 32 is raised to the inclined position, the edge of the support panel 32 between the support panel lower face 34 and the support panel bottom side 38 catches the first, upturned end 56 of the support lever 54 and the support lever 54 pivots around support lever pin 59, so the support lever 54 is parallel and adjacent to the support panel bottom side 38, as shown in FIG. 6.

When an open book or magazine is placed on the inclined support panel 32, its cover, or first and last pages, rests against the support panel upper face 33 and its base rests against the support lever 54. The second, upturned end 57 of the support lever 54 (see FIG. 6) largely blocks the pages from flipping, thus holding the book or magazine open to a chosen page. The reading assembly 20 may also support other types of reading material, such as a stack of unbound papers or a crossword puzzle.

To change the support panel 32 from the open, inclined position to the closed, horizontal position, the user grips the upper end 45 of the support panel 32 and gently pushes the upper end 45 in a generally downward direction so that the support panel pins 39 pop out of the detents 28a, 28b. Once the support panel pins 39 exit the detents 28a, 28b, the support panel 32 releases the support lever 54 from its current position and the support lever 54 falls back against the fifth wall 53. The user then begins to lower the support panel 32 back into the space 19. As the user lowers the support panel 32, the support panel pins 39 slide away from the detents 28a, 28b. As the user continues to lower the support panel 32, the support panel pins 39 reach the ends of the tracks 26, 27, at which point the support panel 32 is in the horizontal position. The closed support panel 32 fits closely within the space 19 in the tray 10 over the support lever 54 (see FIG. 4), so that the flat surface of the tray may be used for eating, drinking, etc. The close fit and enclosed spaces of the tray 10 make it easy to clean in a hurry. Sanitation is an important consideration, since the tray will be used to hold food by multiple passengers on a tight time schedule.

Figure 7:
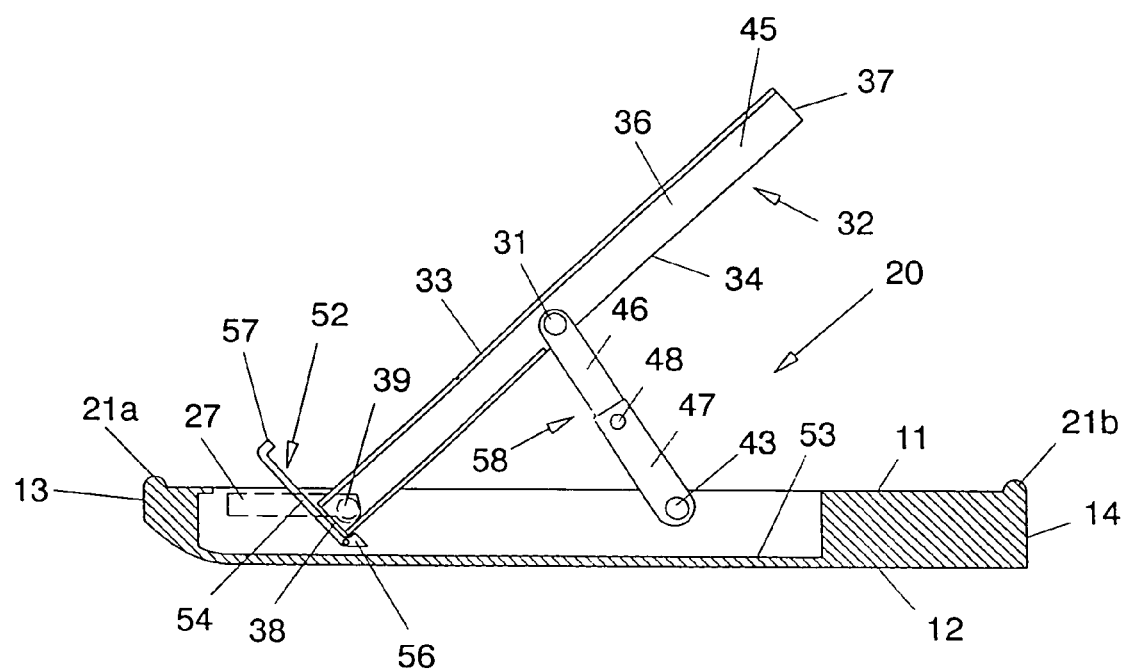
FIG. 7 is a cutaway side elevational view of an alternate embodiment of a tray according to the present invention, shown with a telescoping arm.

In a preferred embodiment of the seat supported reading tray of the present invention, which is depicted in FIG. 7, the arms are telescoping. Each telescoping arm 58 comprises an upper arm section 46 and a lower arm section 47. The upper arm section 46 is slidable into the lower arm section 47. The upper arm section 46 slides out from the lower arm section 47 to increase the length of the telescoping arm 58, or into the lower arm section 47 to decrease the length of the telescoping arm 58. An arm locking mechanism 48, preferably a screw and a wing nut or a twist lock, holds the upper arm section 46 in a desired position within the lower arm section 47, so that the telescoping arm 58 is a desired length. In this embodiment with the telescoping arms, the ends of the support panel rod 31 extend into holes in the upper arm sections 46 of the telescoping arms 58, and the lower pivot pins 43 pivotally connect the lower arm sections 47 of the telescoping arms 58 to the first wall 22 and the third wall 24, respectively.

In this alternate embodiment of the invention, the user may further adjust the incline angle of the support panel 32 once the tray 10 is in the inclined position by manipulating the telescoping arms 58. To do so, the user unlocks the arm locking mechanism 48 on each telescoping arm 58. For example, the user may loosen a wing nut or turn a twist lock until it is unlocked. The user then pulls the upper end 45 of the support panel 32 upward, or pushes the upper end 45 of the support panel 32 downward, until the support panel 32 is at the desired incline angle. As the user pushes or pulls the upper end 45 into position, the upper arm section 46 gradually slides into or out of the lower arm section 47 and support panel pins 39 pivot in the track detents 28a, 28b. Next, the user locks the arm locking mechanisms 48 to secure the support panel 32 at the desired incline angle. Preferably, the incline angle between the top side 11 of the tray and the support panel lower face 34 is adjustable to any angle between approximately 20 degrees and approximately 90 degrees.

Before lowering the tray 10 from the inclined, open position shown in FIG. 7 to the closed, horizontal position, the user may need to adjust the length of the telescoping arms 58 so that the support panel 32 fits into the space 19. If the telescoping arms 58 are too long and the support panel 32 protrudes from the top side 11 of the tray 10, the user unlocks the arm locking mechanisms 48, slides the upper arm sections 46 sufficiently far into the lower arm sections 47, locks the arm locking mechanisms 48, and finally lowers the support panel 32 completely into the space 19.

The support panel 32 is optionally printed with suitable markings for use as a chess or checker board. If the tray 10 is thick enough, chess, checker pieces, marbles, or other game pieces can be stored in the space below the support panel (see FIG. 4) adjacent to the support lever 54 when the support panel is in the closed position. The support tray 32 can optionally be released from the support lever and raised up on the arms 30, 58, so that it is above and parallel to the horizontal fifth wall 53. Where the support panel is made of a transparent material, it can be used to play three dimensional games, such as Chinese checkers.

A most preferred embodiment of the seat supported reading tray 10 for mounting on the back of an airline seat in front of the user has the following measurements:

a) the length of the tray 10 from the front side 13 to the rear side 14 is about 9.9 inches, the depth of the tray 10 from the top side 11 to the bottom side 12 is about 1.1 inch, and the length of the tray 10 from its front side 13 to the fourth wall 25 of the space 19 is about 0.8 inch, so that the tray will fit comfortably in front of an average size passenger seated on an average sized passenger seat; and b) given an airline tray of this size, the length of the support panel 32 from the support panel top side 37 to the support panel bottom side 38 is about 7.9 inches, and the depth of the support panel 32 from the support panel upper face 33 to the support panel lower face 34 is about 0.5 inches, so that the support panel will fit within the space and support an average size book or magazine, yet leave room on either side of the tray for a beverage cup or snack, etc.

Figure 8:
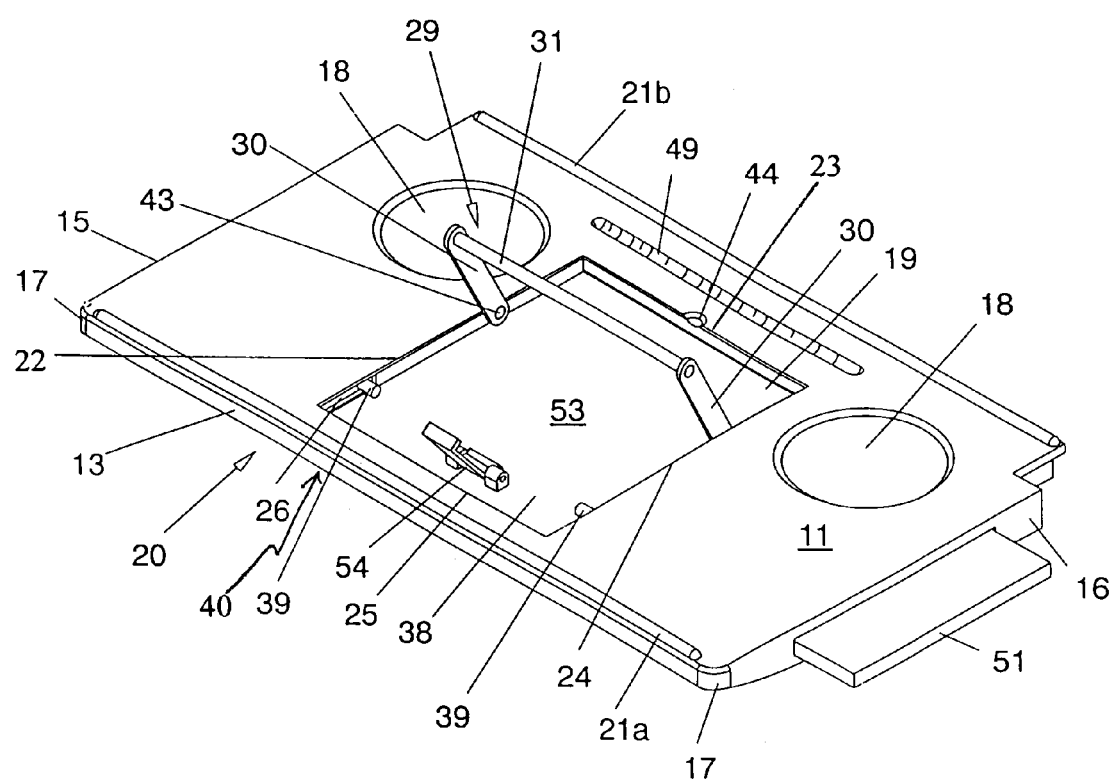
FIG. 8 is a perspective view of an alternate embodiment of a tray according to the present invention, shown with a pen recess and a slidable extension.

An alternate embodiment of the seat supported reading tray of the present invention is shown in FIG. 8 without a support panel 32 for purposes of illustration. This tray embodiment comprises a pen recess 49 and a slidable extension 51. The pen recess 49 is an impression in the top side 11 of the tray 10 between the second wall 23 of the space 19 and the ridge 21 adjacent to the rear side 14 that is large enough to hold at least one pen or pencil. The pen recess 49 preferably accommodates several pens and/or pencils.

In regard to the slidable extension 51 shown in FIG. 8, this generally rectangular, small, planar tray furnishes a user with additional tray space. The slidable extension 51 is made out of the same material as the tray 10, and is slidable into and out of the tray 10. When it is not in use, the slidable extension 51 rests in an opening within the tray 10 either between the first wall 22 and the left side 15 or between the third wall 24 and the right side 16. Depending on its location, an edge of the slidable extension 51 is visible in the left side 15 or the right side 16 of the tray 10. If the user desires additional tray space, the user grips the edge of the slidable extension 51 and pulls it out of the tray 10. A stop (not shown) at the end of the tray 10 prevents the slidable extension 51 from being pulled entirely out of the tray. The slidable extension 51 is shown partially extended in FIG. 8. The slidable extension 51 and the tray 10 are substantially longitudinally oriented. When the user no longer requires the slidable extension 51, or wishes to store the tray 10 in the closed position against the front seat back, the user pushes the slidable extension 51 back within the tray 10 for storage.

Figure 9:
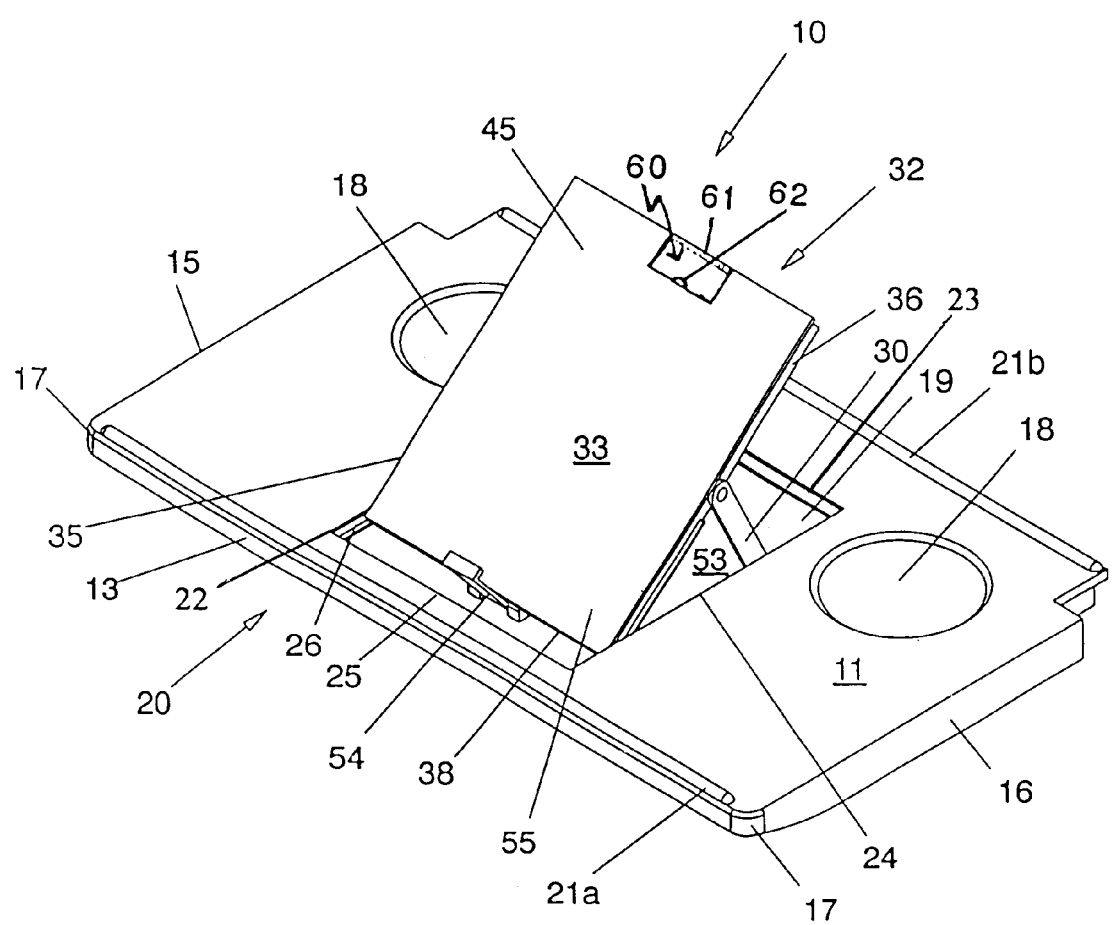
FIG. 9 is a perspective view of a seat supported reading tray according to the present invention, shown with a page holder.

Turning to FIG. 9, the seat supported reading tray 10 of the present invention may optionally further comprise a page holder 60. The page holder 60 comprises a generally rectangular-shaped flap 62, which is attached to the support upper face 33 near the top of the support panel 32 by a spring 61 attached to an upper edge of the page holder flap 62. To use the page holder 60, a user places an open book or magazine on the support panel 32, lifts the page holder flap 62, preferably using a finger well in the flap, and places the flap 62 on the book pages. When in use, the page holder 60 helps to hold the pages of an opened book or magazine flat. The flap 62, which is preferably made of a plastic material, lies flat against the support upper face 33 when it is not in use.

From the foregoing it can be realized that the described device of the present invention may be easily and conveniently utilized as a reading tray for movable attachment to an airline seat or the like. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A reading tray for mounting on a seat, the tray comprising:
    (a) a substantially planar top side and bottom side; the top side being substantially parallel to the opposite, bottom side;
    (b) a space in the center of the top side extending partially through the tray; the space being bounded by at least four walls;
    (c) a support panel that is removably insertable in the space; the support panel comprising at least four panel walls;
    (d) an arm support assembly connected to the support panel for supporting the support panel in an open, inclined position, or in an alternate, closed position wherein the support panel fits closely within the space with an upper face of the support panel flush with the top side of the tray; and
    e) a track mechanism comprising at least one recessed, panel track on a wall of the space, and a panel-moving mechanism for moving a lower end of the support panel back and forth along the at least one track; wherein each of the at least four panel walls is adjacent at least one of the walls of the space when the support panel is in the closed position within the space.

2. A reading tray for mounting on a seat, the tray comprising:
    (a) a substantially planar top side and bottom side; the top side being substantially parallel to the opposite, bottom side;
    (b) a space in the center of the top side extending partially through the tray;
    (c) a support panel that is removably insertable in the space; and
    (d) an arm support assembly connected to the support panel for supporting the support panel in an open, inclined position, or in an alternate, closed position wherein the support panel fits closely within the space with an upper face of the support panel flush with the top side of the tray; and further comprising at least one recessed track in the tray, and a mechanism for moving the support panel along the track; wherein the support panel further comprises at least one support panel pin projecting from a side of the support panel, the support panel pin being slidable in the track.

3. The tray according to claim 2, further comprising: a substantially planar front side, rear side, left side, and right side; the front side being substantially perpendicular to the top side; the rear side being opposite the front side and substantially perpendicular to the top side; the left side being substantially perpendicularly oriented to the front side; the right side being opposite the left side and substantially perpendicular to the front side; the bottom side being substantially perpendicular to the front side, rear side, left side, and right side.

4. The tray according to claim 3, wherein the space is substantially rectangular in shape and bordered by:
(a) a substantially planar first wall;
(b) a substantially planar second wall substantially perpendicularly oriented to the first wall;
(c) a substantially planar third wall opposite the first wall and substantially perpendicularly oriented to the second wall;
(d) a substantially planar fourth wall opposite the second wall and substantially perpendicularly oriented to the third wall; and
(e) a substantially planar fifth wall substantially perpendicularly oriented to the first wall, second wall, third wall, and fourth wall.

5. The tray according to claim 4, further comprising a support lever mechanism comprising a movable support lever, the support lever comprising two opposite, upturned ends, a first one of the support lever upturned ends being hingedly attached to the fifth wall.

6. The tray according to claim 5, wherein the support lever is adjacent and parallel to the fifth wall, and the support panel covers the support lever when the support panel is in the closed position.

7. The tray according to claim 6, wherein the arm support assembly comprises a left arm pivotally attached to the first wall at about a mid-point of the first wall behind the left track, and a right arm pivotally attached to the third wall at about a mid-point of the third wall behind the right track.

8. The tray according to claim 7, wherein an end of the left arm opposite the first wall is pivotally attached to a support panel rod and an end of the right arm opposite the third wall is pivotally attached to the support panel rod, the support panel rod extending transversely through the support panel.

9. The tray according to claim 8, wherein the support panel is generally rectangular in shape and comprises: a substantially planar support panel bottom side, left side, top side, and right side; the support panel left side being substantially perpendicular to the support panel bottom side; the support panel right side being opposite the support panel left side and substantially perpendicular to the support panel top side.

10. The tray according to claim 9, wherein the support panel further comprises: a substantially planar support panel upper face and lower face; the support panel bottom side being substantially perpendicular to the support panel upper face; and the support panel lower face being substantially perpendicular to the support panel bottom side, the support panel left side, and the support panel right side.

11. The tray according to claim 10, wherein an edge between the support panel lower face and the support panel bottom side contacts one upturned end of the support lever as the support panel approaches the inclined position, which moves the opposite end of the support lever up.

12. The tray according to claim 11, wherein the first wall comprises at least one recessed, left track and the third wall comprises a matching, recessed right track, each of the tracks comprising a detent at an end of each of the tracks.

13. The tray according to claim 12, wherein a first one of the support panel pins protrudes from the support panel left side, and a corresponding, second one of the support panel pins protrudes from the support panel right side, and the support panel removably locks into the open, inclined position when the first support panel pin enters the first track detent and the second support panel pin enters the second track detent.

14. The tray according to claim 7, further comprising a finger well in the top side of the tray, the finger well being adjacent to an upper end of the support panel when the support panel is within the space.

15. The tray according to claim 8, further comprising substantially parallel ridges on the top side of the tray adjacent to the front side and the rear side of the tray.

16. The tray according to claim 2, further comprising a generally rectangular-shaped page holder flap attached to the support front face by a page holder spring.

17. The tray according to claim 2, further comprising a slidable extension slidable into and out of the left side or the right side of the tray.

18. The tray according to claim 17, further comprising a pen recess in the top side of the tray between the space and the rear side.

19. A reading tray for mounting on a seat, the tray comprising:
(a) a substantially planar top side and bottom side; the top side being substantially parallel to the opposite, bottom side;
(b) a space in the center of the top side extending partially through the tray;
(c) a support panel that is removably insertable in the space; and
(d) an arm support assembly connected to the support panel for supporting the support panel in an open, inclined position, or in an alternate, closed position wherein the support panel fits closely within the space with an upper face of the support panel flush with the top side of the tray; wherein the arm support assembly comprises at least two telescoping arms and each telescoping arm comprises: (a) a lower arm section; (b) an upper arm section slidable into the lower arm section; and (c) an arm locking mechanism for locking the upper arm section into a position within the lower arm section.

* * * * *